United States Patent
Ueda

(10) Patent No.: US 10,507,660 B2
(45) Date of Patent: Dec. 17, 2019

(54) WASTE LIQUID TANK AND LIQUID DISCHARGING APPARATUS INCLUDING THE SAME

(71) Applicant: BROTHER KOGYO KABUSHIKI KAISHA, Nagoya-shi, Aichi-ken (JP)

(72) Inventor: Toshiro Ueda, Kiyosu (JP)

(73) Assignee: BROTHER KOGYO KABUSHIKI KAISHA, Nagoyua-Shi, Aichi-Ken (JP)

( * ) Notice: Subject to any disclaimer, the term of this patent is extended or adjusted under 35 U.S.C. 154(b) by 0 days.

(21) Appl. No.: 15/855,680

(22) Filed: Dec. 27, 2017

(65) Prior Publication Data

US 2018/0178522 A1 Jun. 28, 2018

(30) Foreign Application Priority Data

Dec. 27, 2016 (JP) ................................. 2016-253085

(51) Int. Cl.
*B41J 2/17* (2006.01)
*B41J 2/165* (2006.01)
*B01D 15/00* (2006.01)

(52) U.S. Cl.
CPC .......... *B41J 2/16517* (2013.01); *B01D 15/00* (2013.01)

(58) Field of Classification Search
CPC ......... B41J 2/16517; B41J 2/1721; B41J 2/18
See application file for complete search history.

(56) References Cited

U.S. PATENT DOCUMENTS

| 5,329,306 A | 7/1994 | Carlotta |
| 2005/0195241 A1 | 9/2005 | Kawai et al. |
| 2006/0244799 A1* | 11/2006 | Sasa ..................... B41J 2/16523 347/89 |
| 2013/0257962 A1 | 10/2013 | Oguchi |
| 2015/0062259 A1* | 3/2015 | Yamada ............... B41J 2/17506 347/85 |
| 2017/0120597 A1* | 5/2017 | Nishikawa ............. B41J 2/1721 |

FOREIGN PATENT DOCUMENTS

| JP | 06-171108 A | 6/1994 |
| JP | 2001-162837 A | 6/2001 |
| JP | 2006-027040 A | 2/2006 |
| JP | 2010-253834 A | 11/2010 |
| JP | 2013-208872 A | 10/2013 |

* cited by examiner

*Primary Examiner* — Jason S Uhlenhake
(74) *Attorney, Agent, or Firm* — Merchant & Gould P.C.

(57) ABSTRACT

There is provided a waste liquid tank including: a casing including an inner wall surface and a communication port; an absorber; a rib protruding from the inner wall surface, extending along the inner wall surface in an extending direction from a position distant from the communication port to a position close to the communication port, and being in contact with the absorber to form a gap between the absorber and the inner wall surface; and an atmosphere communication hole provided in a part, of the inner wall surface, facing the gap. An end of the rib on a side opposite to the communication port in the extending direction is closer to the communication port than the atmosphere communication hole.

16 Claims, 13 Drawing Sheets

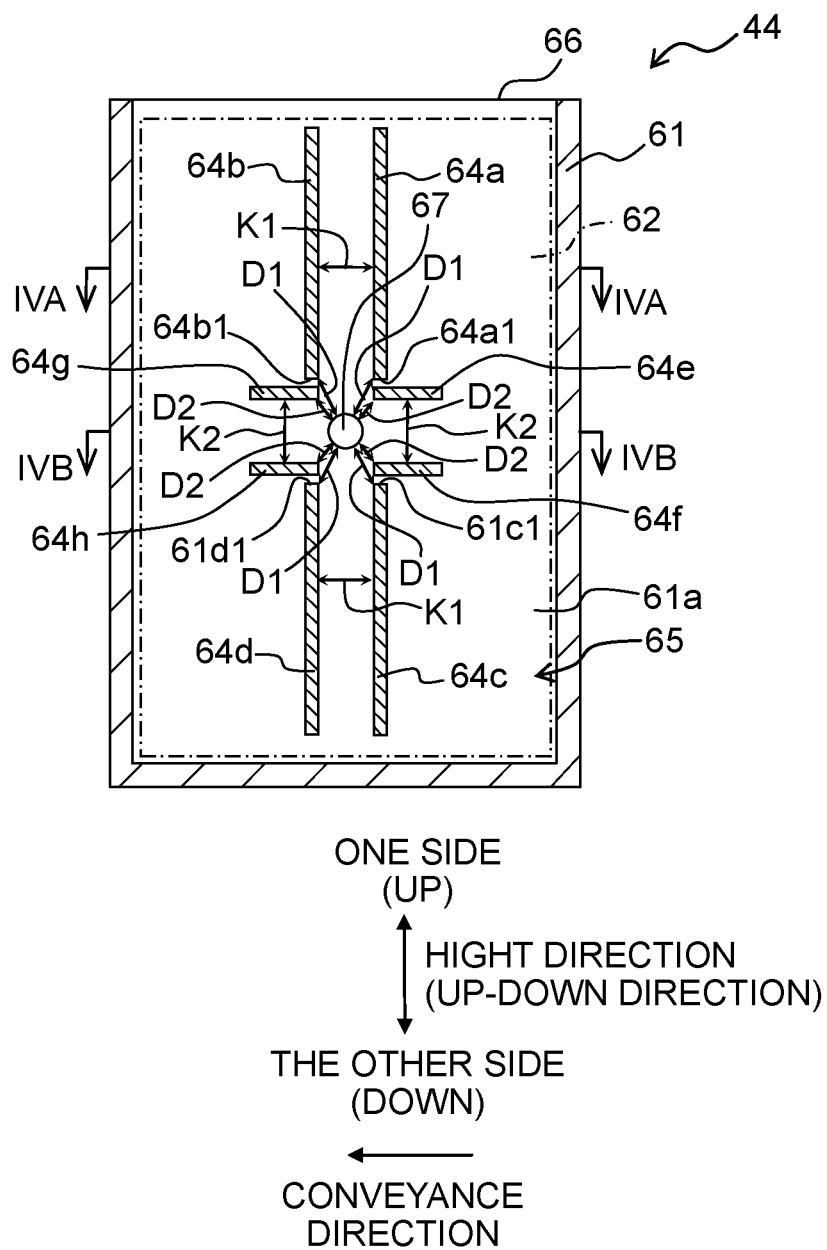

ONE SIDE
(UP)

↕ HIGHT DIRECTION
(UP-DOWN DIRECTION)

THE OTHER SIDE
(DOWN)

←
CONVEYANCE
DIRECTION

Fig. 10
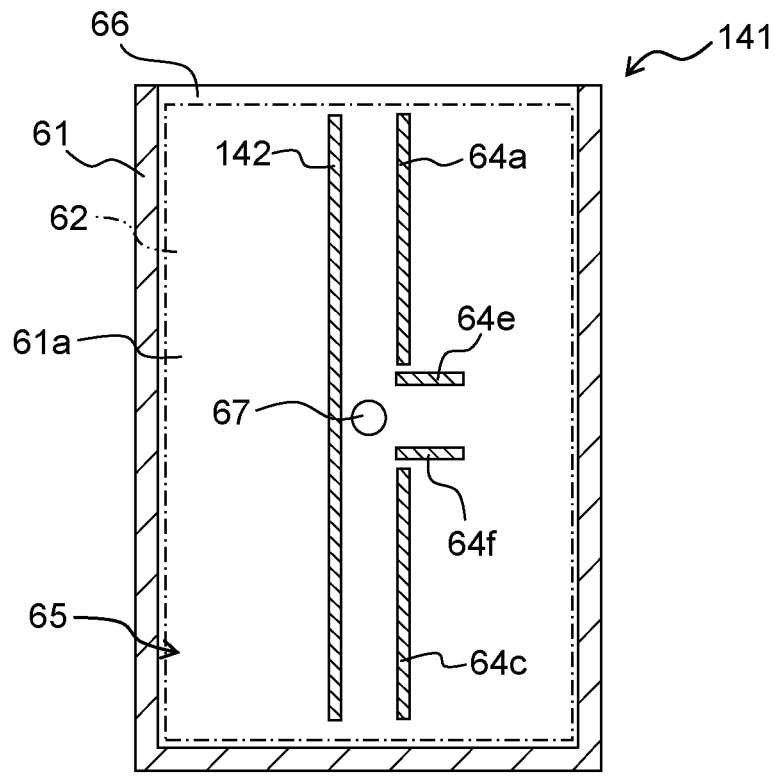
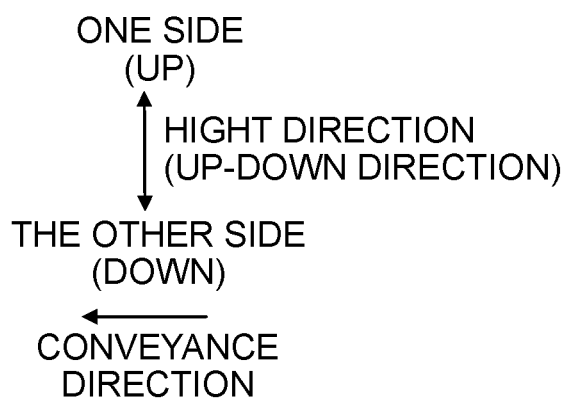

WASTE LIQUID TANK AND LIQUID DISCHARGING APPARATUS INCLUDING THE SAME

CROSS REFERENCE TO RELATED APPLICATION

The present application claims priority from Japanese Patent Application No. 2016-253085 filed on Dec. 27, 2016, the disclosure of which is incorporated herein by reference in its entirety.

BACKGROUND

Field of the Invention

The present invention relates to a waste liquid tank for holding a waste liquid discharged from an apparatus and a liquid discharging apparatus including the same.

Description of the Related Art

As an exemplary waste liquid tank, there is known a waste liquid tank that is provided in an ink-jet recording apparatus to hold an ink discharged from a recording head. In a known ink-jet recording apparatus, a cap that covers nozzles of the recording head is connected to the waste liquid tank via a waste liquid channel. Allowing the waste liquid tank to communicate with the atmosphere allows the cap to communicate with the atmosphere.

SUMMARY

The waste liquid tank may include an ink absorbing foam. In that case, when the ink is absorbed by the ink absorbing foam at the periphery of a connection portion between the waste liquid tank and the waste liquid channel, the communication between the cap and the atmosphere via the waste liquid tank may be blocked.

Further, in the above ink-jet recording apparatus, a communication port that allows the waste liquid tank to communicate with the atmosphere by connecting the waste liquid tank and the outside is typically provided at an upper end of the apparatus in use. However, when the posture of the ink-jet recording apparatus is changed, for example, during transport, the communication port may be positioned at a lateral side of the waste liquid tank. Furthermore, in the above ink-jet recording apparatus, a meniscus in each nozzle may break for any reason, causing the ink to be discharged from the nozzle to the cap and to flow from the connection portion with the cap into the waste liquid tank. When the ink flows into the waste liquid tank in the state where the ink-jet recording apparatus does not have the in-use posture, the ink flowing into the waste liquid tank may not be absorbed by the ink absorbing foam quickly. This may cause the ink to leak from the communication port.

An object of the present teaching is to provide a waste liquid tank that prevents liquid leakage caused when the posture thereof is changed from an in-use posture while keeping a state in which the waste liquid tank communicates with the atmosphere, and a liquid discharging apparatus provided with the waste liquid tank.

According to a first aspect of the present teaching, there is provided a tank configured to hold a waste liquid discharged from a liquid discharging unit. The tank includes: a casing. The casing includes: an inner wall surface defining a space in which the waste liquid is held; and a communication port connecting the space and an outside. The tank further includes: an absorber placed in the space; a rib protruding from the inner wall surface, extending along the inner wall surface in an extending direction from a position distant from the communication port toward a position close to the communication port, and being in contact with the absorber with a gap between the absorber and the inner wall surface; and an atmosphere communication hole provided in a part, of the inner wall surface, facing the gap, connected to the liquid discharging unit, and allowing the liquid discharging unit to communicate with atmosphere via the gap and the communication port. An end of the rib on a side opposite to the communication port in the extending direction is positioned closer to the communication port than the atmosphere communication hole.

According to a second aspect of the present teaching, there is provided a liquid discharging apparatus, including: a liquid discharging head including nozzles located on a nozzle surface; a supply tank connected to the liquid discharging head and configured to hold a liquid to be supplied to the liquid discharging head; a cap configured to cover the nozzles; and a waste liquid tank configured to hold a waste liquid discharged from the liquid discharging head. The waste liquid tank includes: a casing including: an inner wall surface defining a space in which the waste liquid is held; and a communication port provided at one end in an extending direction intersecting with the nozzle surface, and connecting the space and an outside; an absorber placed in the space; a rib protruding from the inner wall surface, extending along the inner wall surface in the extending direction from a position distant from the communication port toward a position close to the communication port, and being in contact with the absorber with a gap between the absorber and the inner wall surface; and an atmosphere communication hole provided in a part, of the inner wall surface, facing the gap, connected to the cap, and allowing the cap to communicate with atmosphere via the gap and the communication port. An end of the rib on a side opposite to the communication port in the extending direction is positioned closer to the communication port than the atmosphere communication hole.

In the present teaching, the rib is in contact with the absorber to form the gap between the absorber and the inner wall surface of the casing. In that configuration, the liquid discharging unit connected to the atmosphere communication hole communicates with the atmosphere via the gap and the communication port, when the liquid is absorbed by the absorber at the periphery of the atmosphere communication hole.

In the present teaching, the end of the rib opposite to the communication port in the extending direction is positioned closer to the communication port than the atmosphere communication hole. In that configuration, the atmosphere communication hole does not overlap with the rib in an orthogonal direction parallel to the inner wall surface and orthogonal to the extending direction. Thus, when the liquid flows from the atmosphere communication hole into the waste liquid tank having a posture in which the extending direction is along a horizontal direction, the liquid is not likely to reach the rib. This prevents the liquid from flowing along the rib and leaking from the communication port.

BRIEF DESCRIPTION OF THE DRAWINGS

FIG. 3 is a cross-sectional view taken along a line in FIG. 2.

FIG. 10 is a diagram of a fifth modified embodiment corresponding to FIG. 3.

DESCRIPTION OF THE EMBODIMENTS

The following explains embodiments of the present teaching.

<Printer>

Figure 1:
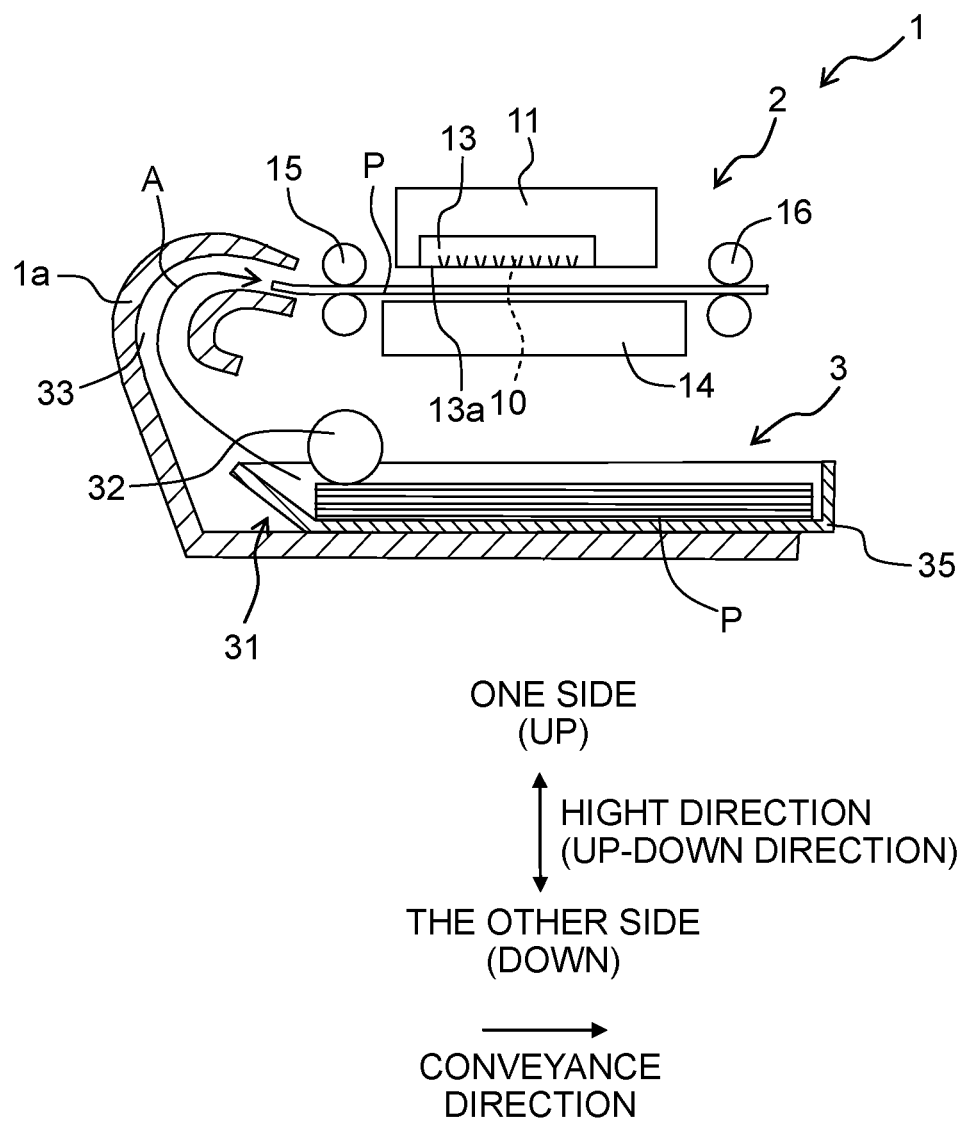
FIG. 1 schematically depicts a configuration of a printer according to an embodiment of the present teaching when seen from a lateral side, the printer having a posture when used.
Figure 2:
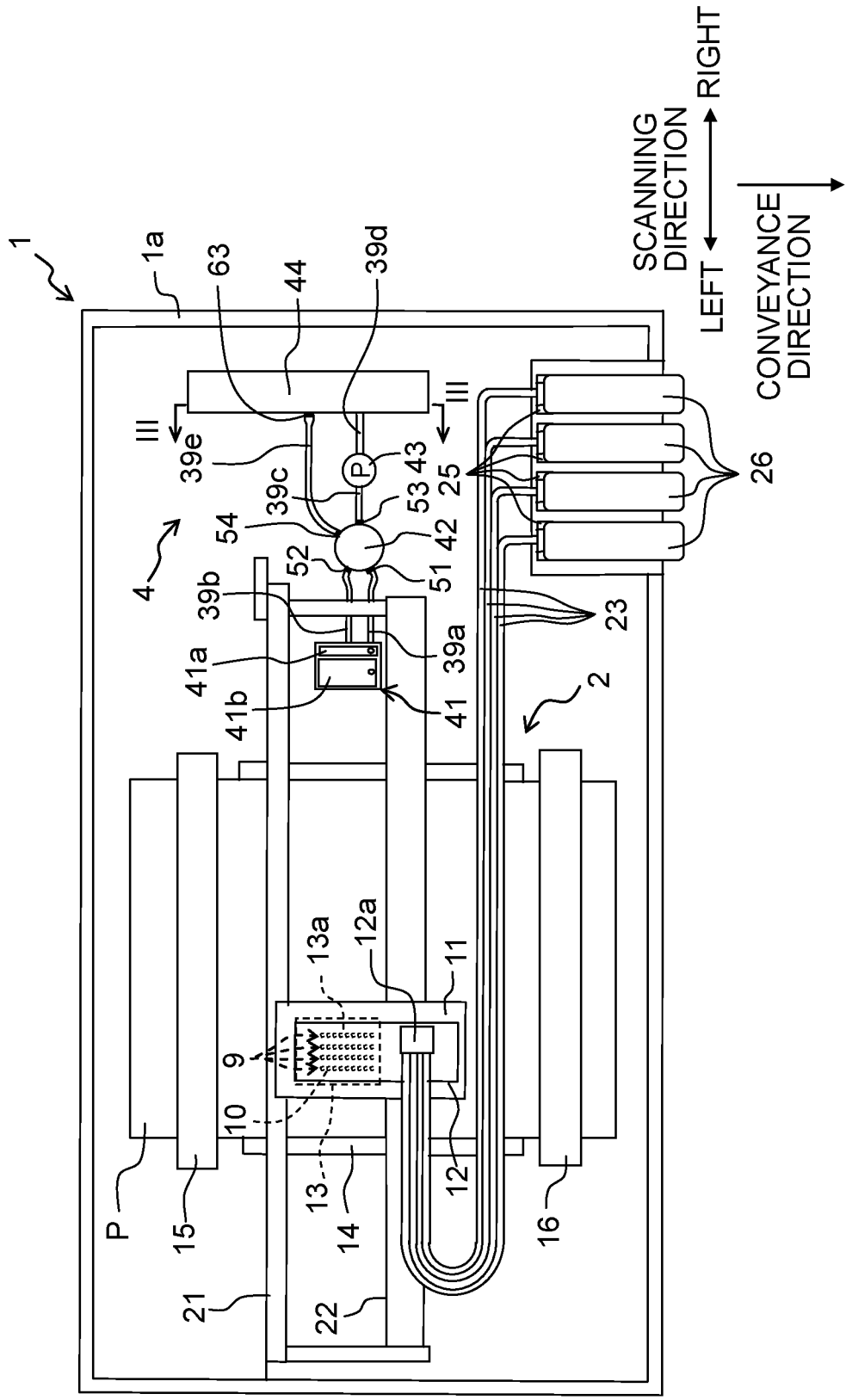
FIG. 2 schematically depicts a configuration of the printer according to the embodiment of the present teaching when seen from an upper side, the printer having the posture when used.

As depicted in FIGS. 1 and 2, a printer 1 of this embodiment (an exemplary liquid discharging apparatus of the present teaching) includes a printing unit 2, a feed unit 3, a maintenance unit 4, and the like. When used, the printer 1 typically has a posture in which a scanning direction that is a movement direction of a carriage 11 described below and a conveyance direction of a recording sheet P (an exemplary medium of the present teaching) that is orthogonal to the scanning direction are horizontal (hereinafter also referred to as an in-use posture). In this embodiment, a direction parallel to the conveyance direction corresponds to an exemplary orthogonal direction of the present teaching. Further, a direction that is parallel to an up-down direction and orthogonal to the scanning direction and the conveyance direction with the printer 1 having the in-use posture is a height direction (an exemplary extending direction of the present teaching). Furthermore, the explanation is made by defining right and left sides in the scanning direction as depicted in FIG. 2. Moreover, the explanation is made by defining upper and lower sides with the printer 1 having the in-use posture, as first and second sides in the height direction, as depicted in FIG. 1.

<Printing Unit>

As depicted in FIGS. 1 and 2, the printing unit 2, which is placed in a printer body 1a (an exemplary apparatus body of the present teaching), includes the carriage 11, a sub tank 12, an ink-jet head 13, a platen 14, conveyance rollers 15 and 16, etc.

The carriage 11 is supported by two guide rails 21 and 22 extending in the scanning direction. The carriage 11 is connected to an unillustrated motor via an unillustrated belt. Driving the motor moves the carriage 11 in the scanning direction along the guide rails 21 and 22.

The sub tank 12 is carried on the carriage 11. A tube joint 12a is provided in a part of the sub tank 12 on the first side in the height direction (the near side in a direction perpendicular to a paper surface of FIG. 2). The printer body 1a includes four cartridge installation parts 25 that are arranged in the scanning direction at a right side in the scanning direction and at a downstream end in the conveyance direction. Ink cartridges 26 (each of which is an exemplary supply tank of the present teaching), which respectively contain black, yellow, cyan, and magenta inks in the order of the ink cartridges 26 from the rightmost side, are installed to the four cartridge installation parts 25. The ink cartridges 26 are downstream of the carriage 11 in the conveyance direction (an exemplary first side in the orthogonal direction of the present teaching). The tube joint 12a is connected to the four cartridge installation parts 25 via four tubes 23. This configuration supplies each ink from each ink cartridge 26 installed to the corresponding cartridge installation part 25 to the sub tank 12 via each tube 23.

Each ink is supplied from the sub tank 12 to the ink-jet head 13, which is disposed at an end portion at the second side in the height direction relative to the sub tank 12 (the far side in the direction perpendicular to the paper surface of FIG. 2). The ink-jet head 13 jets each ink from nozzles 10 formed in a nozzle surface 13a, which is an end surface at the second side in the height direction. The nozzles 10 are aligned in the conveyance direction to form a nozzle array 9. Four nozzle arrays 9 arranged in the scanning direction are formed in the nozzle surface 13a. The inks of black, yellow, cyan, and magenta are jetted from the nozzles 10 in the order of the nozzle arrays 9 from the rightmost side.

The platen 14 is disposed at the second side in the height direction relative to the ink-jet head 13, faces the nozzle surface 13a, and extends along an entire length of the recording sheet P in the scanning direction. The platen 14 supports the recording sheet P from a lower side (from the second side in the height direction) during printing. The conveyance roller 15 is disposed upstream of the platen 14 in the conveyance direction. The conveyance roller 16 is disposed downstream of the platen 14 in the conveyance direction. The conveyance rollers 15 and 16 are connected to an unillustrated motor. Driving the motor rotates the conveyance rollers 15 and 16 to convey the recording sheet P in the conveyance direction.

<Feed Unit>

The feed unit 3 feeds the recording sheet P toward the printing unit 2. As depicted in FIG. 1, the feed unit 3 includes a cassette installation part 31, a feed roller 32, and a feed route 33.

The cassette installation part 31 is provided at a part of the printer body 1a at the second side in the height direction relative to the printing unit 2. A sheet cassette 35 (an exemplary medium cassette of the present teaching) is removably installed to the cassette installation part 31 from the downstream side in the conveyance direction. The sheet cassette 35 loads the recording sheets P stacked in the height direction. The cassette installation part 31 includes the feed roller 32. The feed roller 32 is in contact with a surface of the uppermost recording sheet P, of the recording sheets P loaded in the sheet cassette 35 installed to the cassette installation part 31. The feed roller 32 is connected to an unillustrated motor. Driving the motor rotates the feed roller 32 to feed the uppermost recording sheet P to the upstream side in the conveyance direction.

The feed route 33 is provided in a part, of the printer body 1a, upstream of the printing unit 2 and the cassette installation part 31 in the conveyance direction. The feed route 33 extends from the vicinity of an upstream end in the conveyance direction of the sheet cassette 35 installed to the cassette installation part 31 to a position just upstream of the conveyance roller 15 in the conveyance direction. The recording sheet P fed from the sheet cassette 35 by use of the feed roller 32 is guided to the feed route 33 as depicted by an arrow A in FIG. 1, and then conveyed to the position just upstream of the conveyance roller 15 in the conveyance direction.

In the printer 1, the recording sheet P conveyed to the position just upstream of the conveyance roller 15 in the conveyance direction by use of the feed roller 32 is conveyed by use of the conveyance rollers 15 and 16 by a predefined distance. The carriage 11 moves in the scanning direction every time the recording sheet P is conveyed by the predefined distance, and printing is performed on the recording sheet P by jetting each ink from the ink-jet head 13. The recording sheet P for which printing has been completed is discharged to the downstream side in the conveyance direction by use of the conveyance roller 16.

<Maintenance Unit>

The maintenance unit 4 includes a cap 41, a switching unit 42, a suction pump 43, and a waste liquid tank 44. The cap 41 is disposed on the right of the platen 14. In the printer 1, the carriage 11 is movable to a position where the nozzle surface 13a faces the cap 41 (hereinafter, also referred to as a maintenance position). The cap 41 includes a cap 41a and a cap 41b disposed on the left side of the cap 41a.

The nozzles 10 forming the rightmost nozzle array 9 face the cap 41a in a state where the carriage 11 is in the maintenance position, and the nozzles 10 forming the remaining three nozzle arrays 9 face the cap 41b. The cap 41 is configured to move in the height direction by an unillustrated lifting mechanism. When the cap 41 moves in the height direction to approach the ink-jet head 13 with the carriage 11 being in the maintenance position, the cap 41 contacts tightly with the nozzle surface 13a to cover the nozzles 10. More specifically, the nozzles 10 forming the rightmost nozzle array 9 are covered with the cap 41a, and the nozzles 10 forming the remaining three nozzle arrays 9 are covered with the cap 41b. The present teaching is not limited to the configuration in which the cap 41 is contact tightly with the nozzle surface 13a. For example, when the ink-jet head 13 includes a frame that surrounds the nozzle surface 13a to protect the nozzles 10, the cap 41 may contact tightly with the frame to cover the nozzles 10.

The switching unit 42, which includes cap ports 51 and 52, a suction port 53, and an atmosphere communication port 54, switches connection between the ports 51, 52, 53, and 54. The cap ports 51, 52 are connected to the caps 41a, 41b via tubes 39a, 39b, respectively. The suction port 53 is connected to the suction pump 43 via a tube 39c. The suction pump 43 is a tube pump or the like. An portion of the suction pump 43 on a side opposite to the suction port 53 is connected to the waste liquid tank 44 via a tube 39d. The atmosphere communication port 54, which is connected to the waste liquid tank 44 via a tube 39e, communicates with the atmosphere via the waste liquid tank 44. The configuration in which the atmosphere communication port 54 communicates with the atmosphere via the waste liquid tank 44 will be described below in detail.

In the printer 1, the nozzles 10 are covered with the cap 41 during a standby state where no printing is performed. This prevents the ink in each nozzle 10 from drying. During the standby state, the caps 41a and 41b communicate with the atmosphere by allowing the switching unit 42 to connect the cap ports 51, 52 and the atmosphere communication port 54. This prevents the meniscus of ink in each nozzle 10 from breaking which may be caused by the change in atmospheric pressure in the caps 41a and 41b when temperature varies.

The printer 1 can perform a suction purge of black ink in which the switching unit 42 connects the cap port 51 and the suction port 53 in a state where the nozzles 10 are covered with the cap 41 and the suction pump 43 is driven in a state where the cap port 52 is connected to the atmosphere communication port 54 to discharge the black ink in the ink-jet head 13 from the nozzles 10 that form the rightmost nozzle array 9. Allowing the cap 41b to communicate with the atmosphere by connecting the cap port 52 and the atmosphere communication port 54 prevents the meniscus of ink in each nozzle 10 from breaking which may be caused by the change in pressure in the cap 41b when the cap 41 is deformed during the suction purge to change the volume in the cap 41b.

The printer 1 can perform a suction purge of color inks in which the switching unit 42 connects the cap port 52 and the suction port 53 in a state where the nozzles 10 are covered with the cap 41 and the suction pump 43 is driven in a state where the cap port 51 is connected to the atmosphere communication port 54 to discharge the color inks (yellow, cyan, and magenta inks) in the ink-jet head 13 from the nozzles 10 that form the remaining three nozzle arrays 9. Allowing the cap 41a to communicate with the atmosphere by connecting the cap port 51 and the atmosphere communication port 54 prevents the meniscus of ink in each nozzle 10 from breaking which may be caused by the change in pressure in the cap 41a when the cap 41 is deformed during the suction purge to change the volume in the cap 41a.

After the suction purge, each ink is supplied from the corresponding ink cartridge 26 to the ink-jet head 13 via the sub tank 12 and the tube 23 by an amount corresponding to the amount discharged from the ink-jet head 13 through the suction purge. The waste liquid tank 44 holds each ink discharged through the suction purge.

In the printer 1 of this embodiment, a combination of the ink-jet head 13 that discharges inks therein through the suction purge; the ink cartridges 26 from which inks are supplied to the ink-jet head 13 by amounts corresponding to the discharge amounts; the cap 41 to which inks are discharged from the ink-jet head 13 during the suction purge; the switching unit 42; the suction pump 43; the tubes 23; and the tubes 39a to 39e corresponds to an exemplary liquid discharging unit of the present teaching.

<Waste Liquid Tank>

Figure 4A:
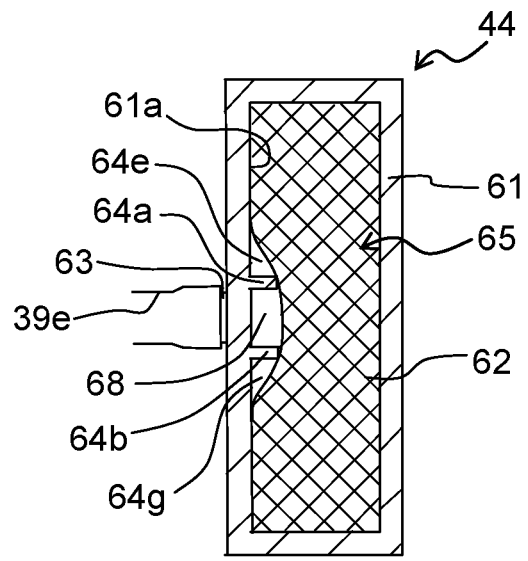
FIG. 4A is a cross-sectional view taken along a line IVA-IVA in FIG. 3.
Figure 4B:
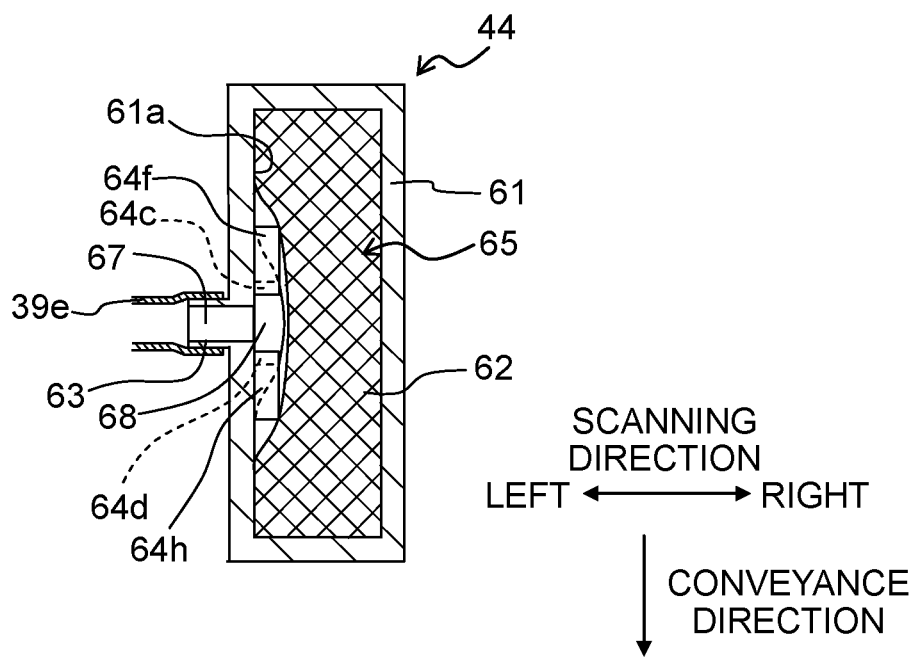
FIG. 4B is a cross-sectional view taken along a line IVB-IVB in FIG. 3

Subsequently, the waste liquid tank 44 will be explained. As depicted in FIG. 2, the waste liquid tank 44 is disposed at a right end of the printer body 1a such that the position thereof in the conveyance direction is substantially the same as that of the carriage 11. As depicted in FIG. 3 and FIGS. 4A and 4B, the waste liquid tank 44 includes a casing 61, an ink absorbing foam 62, a boss 63, and eight ribs 64a to 64h. The casing 61 is a substantially rectangular parallelepiped member, which is made from a synthetic resin material or the like and is long in the height direction. An inner portion of the casing 61 has a holding space 65 holding the waste liquid. A first end of the casing 61 in the height direction is a communication port 66 that allows the holding space 65 to communicate with the outside atmosphere. Thus, the communication port 66 is positioned at an upper end of the casing 61 with the printer 1 having the in-use posture.

The ink absorbing foam 62 (an exemplary absorber of the present teaching) is placed in the holding space 65. The ink absorbing foam 62 may be formed by using, for example, a sponge. The ink absorbing foam 62 may not be a porous member, and may be any member that can absorb liquid. The ink absorbing foam 62 extends over a substantially entire area of the holding space 65. The boss 63 protrudes leftward from a center portion, in the conveyance direction and the height direction, of a left end surface of the casing 61 in the scanning direction. A center portion of the boss 63 and a part of the casing 61 overlapping with the center portion of the boss 63 in the scanning direction include a through hole 67 (an exemplary atmosphere communication hole of the present teaching) extending in the scanning direction and connected to the holding space 65. The boss 63 is connected to an end of the tube 39e on a side opposite to the atmosphere communication port 54. This connects the atmosphere communication port 54 and the waste liquid tank 44. As depicted in FIG. 2, the boss 63 (the through hole 67) is disposed upstream of the cap 41 in the conveyance direction (an exemplary second side in the orthogonal direction of the present teaching).

All the ribs 64a to 64h protrude from an inner wall surface 61a at the left side of the casing 61 in the scanning direction, the surface 61a having the through hole 67. The rib 64a (an exemplary rib or an exemplary first rib of the present teaching) is disposed at the first side in the height direction relative to the through hole 67, is disposed upstream of the through hole 67 in the conveyance direction, and extends along the inner wall surface 61a in the height direction from a position away from the communication port 66 to a position close to the communication port 66. The rib 64b (an exemplary third rib of the present teaching) is disposed at the first side in the height direction relative to the through hole 67, is disposed downstream of the through hole 67 in the conveyance direction, and extends along the inner wall surface 61a in the height direction from a position away from the communication port 66 to a position close to the communication port 66. Thus, ends 64a1, 64b1 of the ribs 64a, 64b at the second side in the height direction (ends on the side opposite to the communication port 66) are closer in the height direction to the communication port 66 than the thorough hole 67.

The rib 64c (an exemplary second rib of the present teaching) is disposed at the second side in the height direction relative to the rib 64a while having an interval between itself and the rib 64a in the height direction. The rib 64c extends along the inner wall surface 61a in the height direction. The rib 64d (an exemplary fourth rib of the present teaching) is disposed at the second side in the height direction relative to the rib 64b while having an interval between itself and the rib 64b in the height direction. The rib 64d extends along the inner wall surface 61a in the height direction. Thus, the rib 64c is disposed upstream of the through hole 67 in the conveyance direction and the rib 64d is disposed downstream of the through hole 67 in the conveyance direction. Further, ends 64c1, 64d1 of the ribs 64c, 64d at the first side in the height direction (ends on the side close to the communication port 66) are disposed at the second side in the height direction relative to the through hole 67 (positions more distant from the communication port 66 than the through hole 67).

Arranging the ribs 64a to 64d in the above positions allows the ribs 64a, 64b to be symmetric about the through hole 67 in the conveyance direction and allows the ribs 64c, 64d to be symmetric about the through hole 67 in the conveyance direction. Further, arranging the ribs 64a to 64d in the above positions allows the ribs 64a, 64c to be symmetric about the through hole 67 in the height direction and allows the ribs 64b, 64d to be symmetric about the through hole 67 in the height direction.

In this embodiment, as depicted in FIGS. 4A and 4B, the ink absorbing foam 62 placed in the holding space 65 is deformed by making contact with front ends of the ribs 64a to 64d. A gap 68 extending in the height direction to lead to the communication port 66 is formed between the ink absorbing foam 62 deformed and the inner wall surface 61a. Thus, even when the ink is absorbed by the ink absorbing foam 62 at the periphery of the through hole 67, the through hole 67 communicates with the communication port 66 via the gap 68. When the switching unit 42 connects the cap ports 51, 52 and the atmosphere communication port 54, the caps 41a, 41b communicate with the atmosphere via the tubes 39a and 39b, the atmosphere communication port 54, the tube 39e, the through hole 67, the gap 68, and the communication port 66.

In this embodiment, the ribs 64a, 64b are disposed at the first side in the height direction relative to the through hole 67, and the ribs 64c, 64d are disposed at the second side in the height direction relative to the through hole 67. This allows the gap 68 to reliably extend beyond both ends of the through hole 67 in the height direction. Further, the ribs 64a, 64c are disposed upstream of the through hole 67 in the conveyance direction, and the ribs 64b, 64d are disposed downstream of the through hole 67 in the conveyance direction. This allows the gap 68 to reliably extend beyond both ends of the through hole 67 in the conveyance direction. Thus, the through hole 67 reliably faces the gap 68, preventing the through hole 67 from being closed with the ink absorbing foam 62.

The rib 64e, which is disposed between the rib 64a and the through hole 67 in the height direction, extends along the inner wall surface 61a in the conveyance direction. Further, a downstream end of the rib 64e in the conveyance direction is disposed at substantially the same position as the rib 64a, and an upstream end of the 64e in the conveyance direction is disposed upstream of the rib 64a. The rib 64f, which is disposed between the rib 64c and the through hole 67 in the height direction, extends along the inner wall surface 61a in the conveyance direction. Both ends of the rib 64f in the conveyance direction are disposed at substantially the same positions as the both ends of the rib 64e in the conveyance direction. Thus, the ribs 64e and 64f are arranged in the height direction with an interval intervening therebetween.

The rib 64g, which is disposed between the rib 64b and the through hole 67 in the height direction, extends along the inner wall surface 61a in the conveyance direction. An upstream end of the rib 64g in the conveyance direction is disposed at substantially the same position as the rib 64b, and a downstream end of the rib 64g in the conveyance direction is disposed downstream of the rib 64b. The rib 64h, which is disposed between the rib 64d and the through hole 67 in the height direction, extends along the inner wall surface 61a in the conveyance direction. Both ends of the rib 64h in the conveyance direction are disposed at substantially the same positions as the both ends of the rib 64g in the conveyance direction. Thus, the ribs 64g and 64h are arranged in the height direction with an interval intervening therebetween.

Arranging the ribs 64e to 64h in the above positions allows the through hole 67 to be positioned between the ribs 64*e* and 64*f* in the height direction and between the ribs 64*g* and 64*h* in the height direction.

Arranging the ribs 64*e* to 64*h* in the above positions allows the ribs 64*e*, 64*f* to be symmetric about the through hole 67 in the height direction and allows the ribs 64*g*, 64*h* to be symmetric about the through hole 67 in the height direction. Further, arranging the ribs 64*e* to 64*h* in the above positions allows the ribs 64*e*, 64*g* to be symmetric about the through hole 67 in the conveyance direction and allows the ribs 64*f*, 64*h* to be symmetric about the through hole 67 in the conveyance direction. A shortest distance D2 between the ribs 64*e* to 64*h* and the through hole 67 is shorter than a shortest distance D1 between the ribs 64*a* to 64*d* and the through hole 67.

In this embodiment, an interval K2 between the ribs 64*e* and 64*f* in the height direction and between the ribs 64*g* and 64*h* in the height direction is longer than an interval K1 between the ribs 64*a* and 64*b* in the conveyance direction and between the ribs 64*c* and 64*d* in the conveyance direction.

In this embodiment, each of the ribs 64*e* to 64*h* corresponds to an exemplary guide rib of the present teaching. Although the ribs 64*e* to 64*h* extend in the conveyance direction in this embodiment, the ribs 64*e* to 64*h* may extend in a direction that is slightly inclined to the conveyance direction. The same is true on a guide rib in each modified embodiment described below.

Figure 5A:
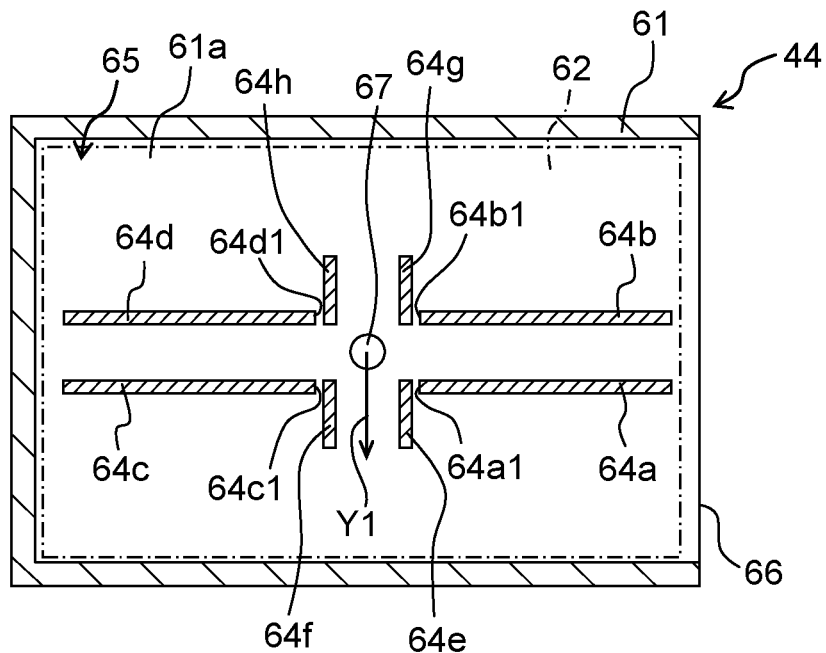
FIG. 5A is a diagram corresponding to FIG. 3, the printer having a posture when transported.

Here, as described above, the printer 1 has the in-use posture when normally used, in which the scanning direction and the conveyance direction are horizontal and the first side in the height direction is the upper side in the up-down direction. For the purpose of convenience etc., as depicted in FIG. 5A, the printer 1 may have a posture (hereinafter also referred to as a transport posture) in which the downstream side in the conveyance direction is the upper side in the up-down direction during transportation etc. The reason why the transport posture is not a posture, in which the downstream side in the conveyance direction is the lower side in the up-down direction, which is the reverse of the above posture (hereinafter also referred to as a reverse posture) is, for example, as follows. In the configuration in which the sheet cassette 35 is installed to the cassette installation part 31 from the downstream side in the conveyance direction, the sheet cassette 35 can be prevented from falling from the cassette installation part 31 by positioning the sheet cassette 35 in a direction in which the installation direction of the cassette installation part 31 goes from the upper side to the lower side with the printer 1 having the transport posture. Further, when the printer 1 has the transport posture, the communication port 66 is positioned at a side end of the casing 61.

In the printer 1, each cartridge installation part 25 is disposed downstream of the ink-jet head 13 in the conveyance direction, as depicted in FIG. 1. Thus, when the printer 1 has the transport posture, each cartridge installation part 25 is disposed above the ink-jet head 13. In that configuration, the head difference between the ink in the ink cartridge 26 installed to the cartridge installation part 25 and the ink in the ink-jet head 13 may break the meniscus of ink in each nozzle 10, which may cause the ink to leak from each nozzle 10 to the cap 41 (caps 41*a*, 41*b*). The ink leaking into the cap 41 may flow from the through hole 67 into the holding space 65 of the waste liquid tank 44 after passing through the tubes 39*a*, 39*b*, the switching unit 42, and the tube 39*e*. In this embodiment, the through hole 67 is disposed upstream of the cap 41 in the conveyance direction. Thus, when the printer 1 has the transport posture, the through hole 67 is positioned below the cap 41, which easily causes the flowing of ink from the cap 41 to the through hole 67 as described above.

Figure 5B:
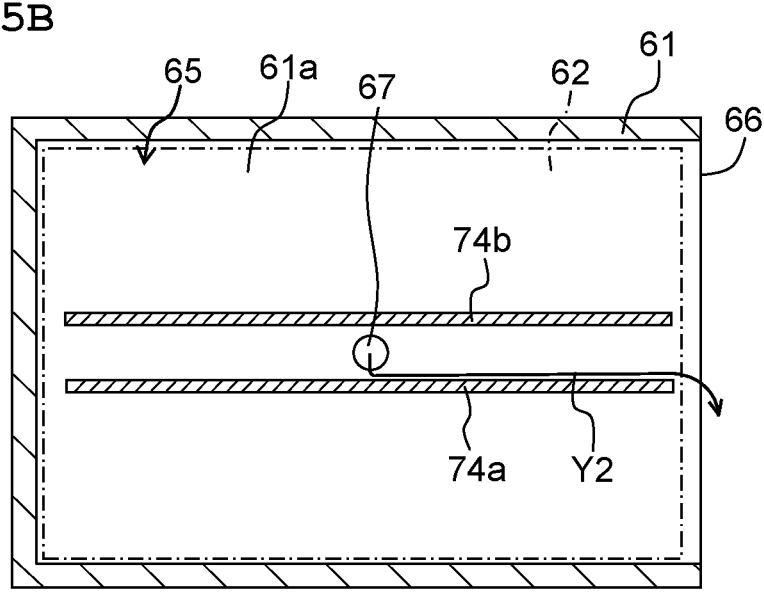
FIG. 5B is a diagram of a comparative example corresponding to FIG. 5A.

Here, unlike this embodiment, there is an example (hereinafter also referred to as a comparative example) in which two ribs 74*a* and 74*b* as depicted in FIG. 5B are provided instead of the ribs 64*a* to 64*h*. The rib 74*a* is disposed upstream of the through hole 67 in the conveyance direction and the rib 74*b* is disposed downstream of the through hole 67 in the conveyance direction. The ribs 74*a* and 74*b* extend along the inner wall surface 61*a* in the height direction. The ribs 74*a* and 74*b* extend in the height direction with the through hole 67 disposed therebetween in the conveyance direction. Namely, the rib 74*a*, the rib 74*b*, and the through hole 67 are arranged in the conveyance direction. In the comparative example, when the printer 1 has the transport posture, the rib 74*a* is positioned below the through hole 67 as depicted in FIG. 5B. Thus, the ink flowing from the through hole 67 into the holding space 65 may reach the rib 74*a* positioned below the through hole 67 as depicted by an arrow Y2 in FIG. 5B, and may flow along the rib 74*a* to leak from the communication hole 66. Further, in the comparative example, the rib 74*b* is disposed above the through hole 67. The ink flowing from the through hole 67 into the holding space 65 fails to move upward and thus no ink reaches the ink absorbing foam 62. Accordingly, in the comparative example, the ink flowing from the through hole 67 into the holding space 65 is likely to flow along the rib 74*a* to leak from the communication port 66.

Meanwhile, in this embodiment, the end 64*a*1 of the rib 64*a* is positioned at the first side in the height direction relative to the through hole 67, and the end 64*c*1 of the rib 64*c* is positioned at the second side in the height direction relative to the through hole 67. The ribs 64*a*, 64*c* and the through hole 67 are not arranged in the conveyance direction. Thus, when the printer 1 has the transport posture, as depicted in FIG. 5A, the ribs 64*a*, 64*c* are not positioned immediately below the through hole 67. In that configuration, the ink flowing from the through hole 67 into the holding space 65 easily reaches the ink absorbing foam 62 by passing between the ribs 64*a* and 64*c*, as depicted by an arrow Y1 in FIG. 5A. This makes it difficult for the ink to reach the rib 64*a*, thus preventing the ink from flowing along the rib 64*a* and leaking from the communication port 66.

In this embodiment, the ribs 64*e* and 64*f*, which extend along the inner wall surface 61*a* in the conveyance direction and arranged in the height direction with the interval therebetween, are arranged between the ribs 64*a* and 64*c* in the height direction. Thus, when the ink flowing from the through hole 67 into the holding space 65 reaches the ribs 64*e* and 64*f*, the ink easily reaches the ink absorbing foam 62 by flowing along the ribs 64*e* and 64*f*. Further, since the through hole 67 is positioned between the ribs 64*e* and 64*f* in the height direction, the ink flowing from the through hole 67 into the holding space 65 easily flows between the ribs 64*e* and 64*f* This reliably prevents the ink from flowing along the rib 64*a* and leaking from the communication port 66.

In this embodiment, the interval K2 between the ribs 64*e* and 64*f* is longer than the interval K1 between the ribs 64*a* and 64*b*. Thus, the ink flowing from the through hole 67 into the holding space 65 is more likely to flow between the ribs 64*e* and 64*f* than between the ribs 64*a* and 64*b*. This reliably prevents the ink from flowing along the rib 64*a* and leaking from the communication port 66.

In this embodiment, the shortest distance D2 between the ribs 64*e*, 64*f* and the through hole 67 is shorter than the shortest distance D1 between the through hole 67 and the ribs 64a, 64c. Thus, the ink flowing from the through hole 67 into the holding space 65 is more likely to arrive at the ribs 64e and 64f than at the ribs 64a and 64c. Thus, the ink easily reaches the ink absorbing foam 62 by flowing along the ribs 64e and 64f, which makes it possible to reliably prevent the ink from flowing along the rib 64a and leaking from the communication port 66.

In this embodiment, the ribs 64a to 64h are arranged such that the ribs 64a and 64b, the ribs 64c and 64d, the ribs 64e and 64g, and the ribs 64f and 64h are symmetric about the through hole 67 in the conveyance direction. Thus, even when the printer 1 has the reverse posture, the ink flowing from the through hole 67 into the holding space 65 easily reaches the ink absorbing form 62 similarly to the above, namely, by flowing between the ribs 64b and 64d (between the ribs 64g and 64h). This prevents the ink from flowing along the rib 64b and leaking from the communication port 66.

The following explains modified embodiments in which various modifications have been added to the embodiment.

In the above embodiment, the through hole 67 is disposed upstream of the cap 41 in the conveyance direction. The present teaching, however, is not limited thereto. The through hole 67 may have the same position in the conveyance direction as the cap 41. Or, the through hole 67 may be disposed downstream of the cap 41 in the conveyance direction. In those cases, the through hole 67 is disposed at the same height as the cap 41 or above the cap 41 with the printer 1 having the transport posture. However, such as when the amount of ink leaking from each nozzle 10 to the cap 41 is large, the ink leaked may flow from the through hole 67 into the holding space 65.

In the above embodiment, each cartridge installation part 25 is disposed downstream of the ink-jet head 13 in the conveyance direction. The present teaching, however, is not limited thereto. Each cartridge installation part 25 may be disposed upstream of the ink-jet head 13 in the conveyance direction. In that configuration, the meniscus of ink in each nozzle 10 may be broken due to, for example, the head difference between the ink in the ink cartridge 26 and the ink in the ink-jet head 13 with the printer 1 having the reverse posture, or vibration etc., caused when the printer 1 having the transport posture is transported. This may cause the ink to leak from each nozzle 10 to the cap 41.

Instead of arranging each cartridge installation part 25 and the ink-jet head 13 in different positions in the conveyance direction, they may have the same position in the conveyance direction. In that configuration, when the printer 1 has the transport posture or the reverse posture, there is no head difference between the ink in the ink cartridge 26 installed to the cartridge installation part 25 and the ink in the ink-jet head 13. Thus, the meniscus of ink in each nozzle 10 is not broken by the head difference. However, the meniscus of ink in each nozzle 10 may be broken by, for example, the vibration caused when the printer 1 having the transport posture is transported. This may cause the ink to leak from each nozzle 10 to the cap 41.

In the above embodiment, the interval K2 between the ribs 64e and 64f and between the ribs 64g and 64h is longer than the interval K1 between the ribs 64a and 64b and between the ribs 64c and 64d. The present teaching, however, is not limited thereto. The interval K2 may be not more than the interval K1.

In the above embodiment, the shortest distance D2 between the through hole 67 and the ribs 64e to 64h is shorter than the shortest distance D1 between the through hole 67 and the ribs 64a to 64d. The shortest distance D2, however, may be not less than the shortest distance D1.

Figure 6:
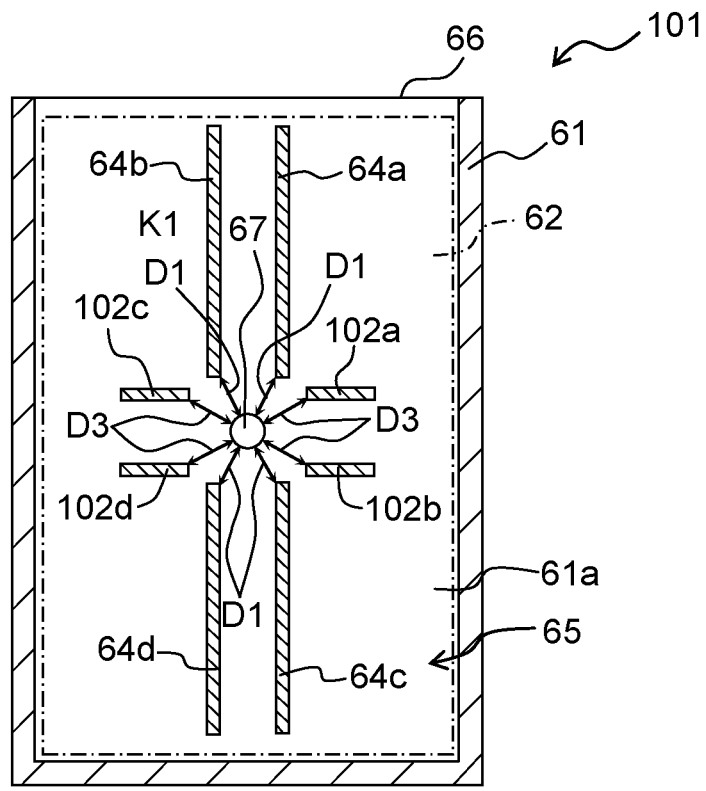
FIG. 6 is a diagram of a first modified embodiment corresponding to FIG. 3.

In the above embodiment, the downstream ends of the ribs 64e, 64f in the conveyance direction are at the same positions as the ribs 64a, 64c, and the upstream ends of the ribs 64g, 64h in the conveyance direction are at the same positions as the ribs 64b, 64d. The present teaching, however, is not limited thereto. For example, in a first modified embodiment, as depicted in FIG. 6, a waste liquid tank 101 is provided with ribs 102a, 102b (each of which is an exemplary guide rib of the present teaching) corresponding to the ribs 64e, 64f, at positions upstream of the ribs 64e, 64f (see FIG. 3) in the conveyance direction. In that configuration, the ribs 102a, 102b are entirely disposed upstream of the ribs 64a, 64c in the conveyance direction. Further, the waste liquid tank 101 is provided with ribs 102c, 102d (each of which is an exemplary guide rib of the present teaching) corresponding to the ribs 64g, 64h (see FIG. 3), at positions downstream of the ribs 64g, 64h in the conveyance direction. In that configuration, the ribs 102c, 102d are entirely disposed downstream of the ribs 64b, 64d in the conveyance direction. Since the ribs 102a to 102d are arranged as described above in the first modified embodiment, a shortest distance D3 between the through hole 67 and the ribs 102a to 102d is longer than a shortest distance D1 between the through hole 67 and the ribs 64a to 64d.

In that case, when the ink flows from the through hole 67 into the holding space 65 with the printer 1 having the transport posture, the ink easily reaches the ink absorbing foam 62 by flowing between the ribs 64a and 64c and flowing between the ribs 102a and 102b, in that order. Further, when the ink flows from the through hole 67 into the holding space 65 with the printer 1 having the reverse posture, the ink easily reaches the ink absorbing foam 62 by flowing between the ribs 64b and 64d and flowing between the ribs 102c and 102d in that order.

In the above embodiment, the through hole 67 is disposed between the ribs 64e and 64g and between the ribs 64f and 64h in the height direction. The present teaching, however, is not limited thereto. For example, the ribs 64e to 64h and the through hole 67 may be arranged in the conveyance direction.

In the above embodiment, in addition to the ribs 64a to 64d extending along the inner wall surface 61a in the height direction, the waste liquid tank 44 is provided with the ribs 64e to 64h extending along the inner wall surface 61a in the conveyance direction. The ribs 64e and 64f are disposed with the interval therebetween in the height direction, and the ribs 64g and 64h are disposed with the interval therebetween in the height direction. The present teaching, however, is not limited thereto.

Figure 7:
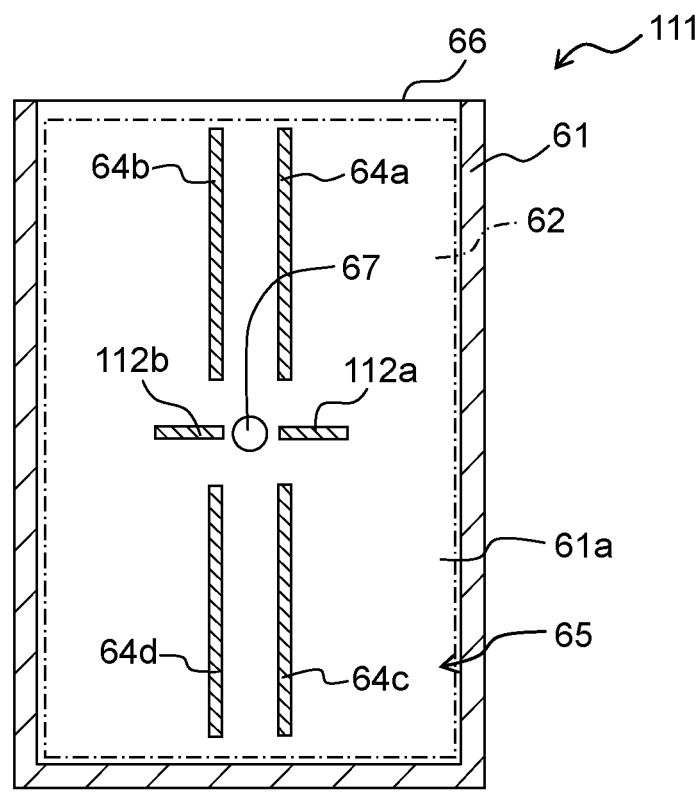
FIG. 7 is a diagram of a second modified embodiment corresponding to FIG. 3.

For example, in a second modified embodiment, as depicted in FIG. 7, a waste liquid tank 111 is provided with two ribs 112a and 112b (each of which is an exemplary guide rib of the present teaching) instead of the four ribs 64e to 64h (see FIG. 3). The rib 112a extends along the inner wall surface 61a in the conveyance direction. A downstream end of the rib 112a in the conveyance direction is disposed between the ribs 64a and 64c. The rib 112b extends along the inner wall surface 61a in the conveyance direction. An upstream end of the rib 112b in the conveyance direction is disposed between the ribs 64b and 64d. The ribs 112a and 112b have the same position in the height direction as the center of the through hole 67, and the through hole 67 and ribs 112a, 112b are aligned in the conveyance direction.

In the second modified embodiment, when the ink flows from the through hole 67 into the holding space 65 with the printer 1 having the transport posture, the ink easily reaches the ink absorbing foam 62 by flowing between the ribs 64a and 112a and flowing between the ribs 64c and 112a. Further, since the rib 112a extends along the inner wall surface 61a in the conveyance direction, the ink reaching the rib 112a easily flows along the rib 112a. Similarly, when the ink flows from the through hole 67 into the holding space 65 with the printer 1 having the reverse posture, the ink easily reaches the ink absorbing foam 62 by flowing between the ribs 64b and 112b and flowing between the ribs 64d and 112b.

Figure 8:
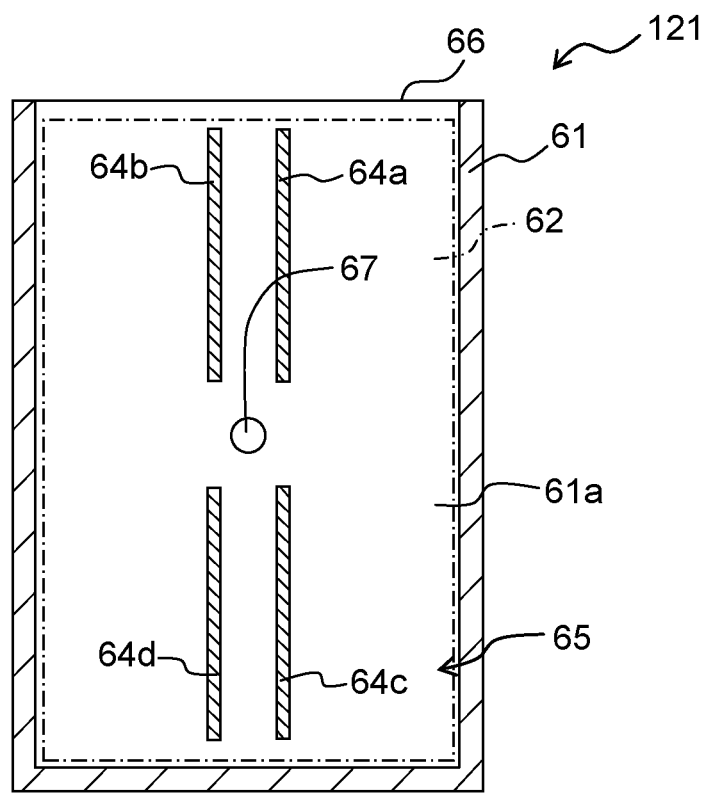
FIG. 8 is a diagram of a third modified embodiment corresponding to FIG. 3.

The present teaching is not limited to the configuration in which the ribs extend along the inner wall surface 61a in the conveyance direction independently of the ribs 64a to 64d that extend along the inner wall surface 61a in the height direction. In a third modified embodiment, as depicted in FIG. 8, a waste liquid tank 121 eliminates the ribs 64e to 64h provided in the waste liquid tank 44 (see FIG. 3). Although all the ribs 64e to 64h are not provided in the waste liquid tank 121 according to the third modified embodiment, some of the ribs 64e to 64h may be provided in the waste liquid tank 121.

In the above embodiment and the modified embodiments, the ribs are arranged symmetrically about the through hole 67 in the height direction and the conveyance direction. The present teaching, however, is not limited thereto. The ribs may be arranged symmetrically about the through hole 67 in only one of the height direction and the conveyance direction, or may not be arranged symmetrically about the through hole 67 in the both directions.

Figure 9A:
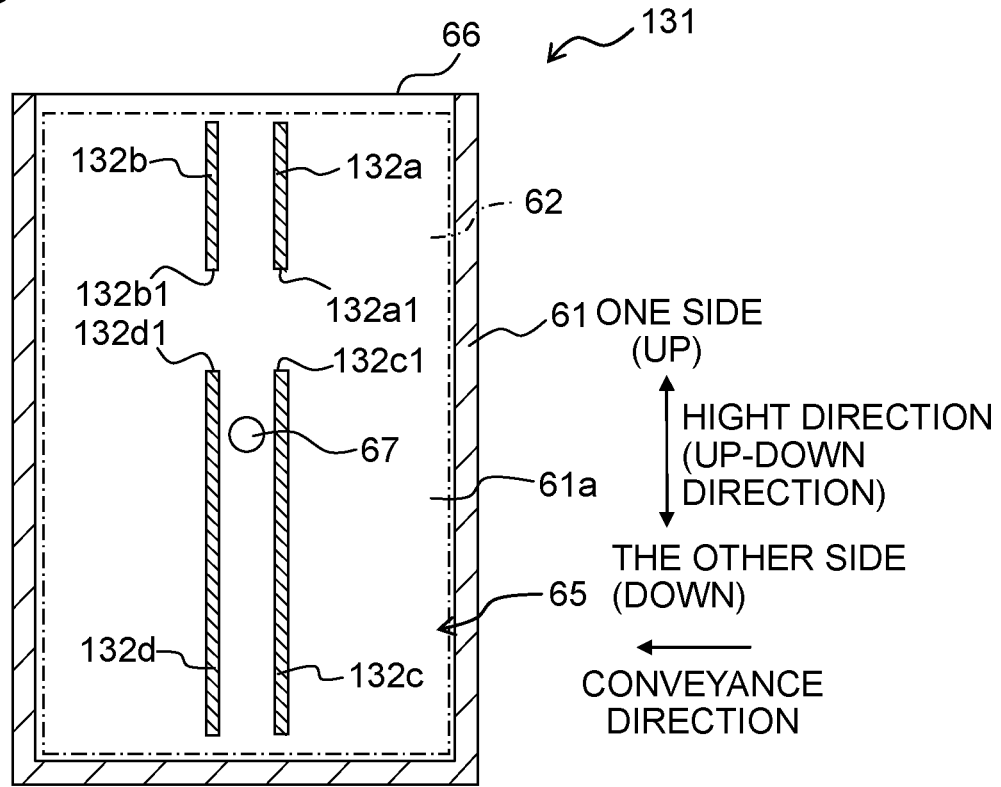
FIG. 9A is a diagram of a fourth modified embodiment corresponding to FIG. 3.

In the above embodiment, the ends 64a1, 64b1 of the ribs 64a, 64b are disposed at the first side in the height direction relative to the through hole 67, and the ends 64c1, 64d1 of the ribs 64c, 64d are disposed at the second side in the height direction relative to the through hole 67. The present teaching, however, is not limited thereto. In a fourth modified embodiment, as depicted in FIG. 9A, a waste liquid tank 131 is provided with ribs 132a to 132d instead of the ribs 64a to 64d (see FIG. 3). Similarly to the ribs 64a to 64d, the ribs 132a to 132d extend along the inner wall surface 61a in the height direction. Further, ends 132a1 and 132b1 of the ribs 132a and 132b which correspond to the ribs 64a and 64b are disposed at the first side in the height direction relative to the ends 64a1 and 64b1 of the ribs 64a and 64b. Ends 131c1 and 132d1 of the ribs 132c and 132d which correspond to the ribs 64c and 64d are positioned at the first side in the height direction relative to the through hole 67. Thus, in the fourth modified embodiment, both the ends 132a1, 132b1 of the ribs 132a, 132b and the ends 132c1, 132d1 of the ribs 132c, 132d are disposed between the communication port 66 and the through hole 67 in the height direction. In the fourth modified embodiment, the rib 132a corresponds to an exemplary rib or an exemplary first rib of the present teaching, the rib 132c corresponds to an exemplary second rib of the present teaching, the rib 132b corresponds to an exemplary third rib of the present teaching, and the rib 132d corresponds to an exemplary fourth rib of the present teaching.

Figure 9B:
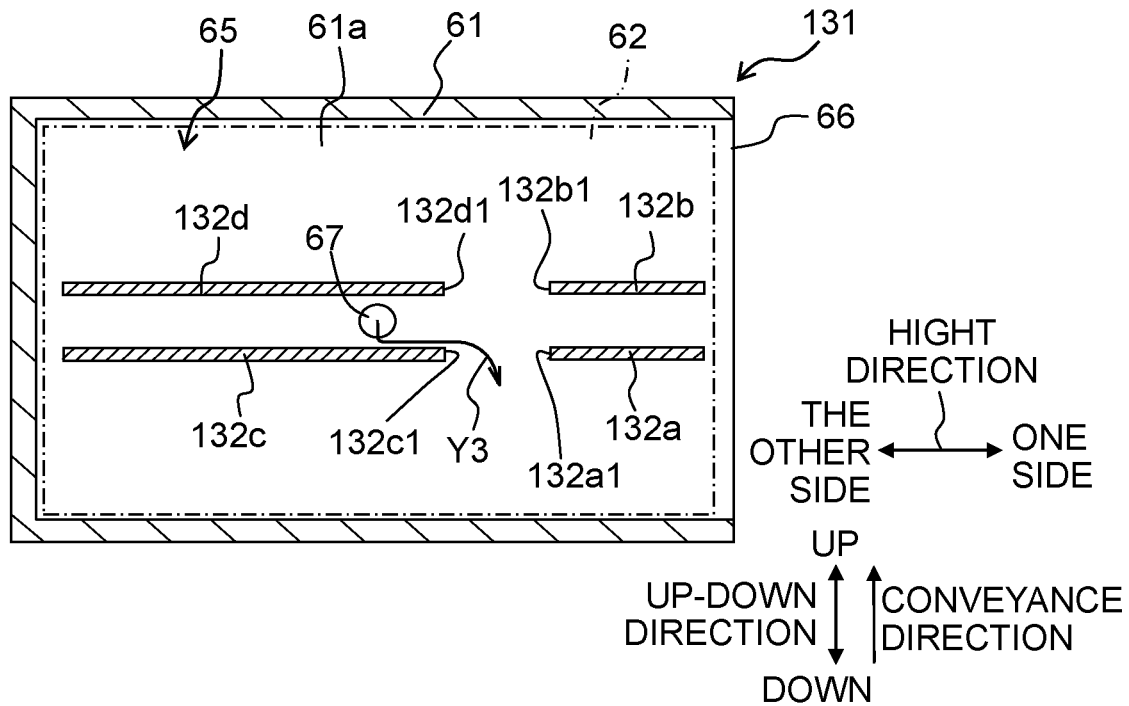
FIG. 9B is a diagram of the fourth modified embodiment corresponding to FIG. 5A.

In the fourth embodiment, when the ink flows from the through hole 67 into the holding space 65 with the printer 1 having the transport posture, the ink running toward the communication port 66 easily reaches the ink absorbing foam 62 by flowing along a rib 132c positioned below the through hole 67 and flowing between the ribs 132a and 132c, as depicted by an arrow Y3 in FIG. 9B. This prevents the ink from reaching the rib 132a, flowing along the rib 132a, and leaking from the communication port 66. Similarly, when the ink flows from the through hole 67 into the holding space 65 with the printer 1 having the reverse posture, the ink easily reaches the ink absorbing foam 62 by flowing along the rib 132d and flowing between the ribs 132b and 132d.

In the above embodiment, the ribs 64b, 64d are disposed with the interval in the height direction. The present teaching, however, is not limited thereto. In a fifth modified embodiment, as depicted in FIG. 10, a waste liquid tank 141 is provided with a rib 142 (an exemplary third rib of the present teaching) instead of the ribs 64b, 64d (see FIG. 3). The rib 142 extends along the inner wall surface 61a in the height direction to face the rib 64a, the rib 64c, and the through hole 67. The rib 142, the rib 64a, the rib 64c, and the through hole 67 are arranged in the conveyance direction.

When transported, the printer typically has the transport posture, namely, hardly has the reverse posture. Thus, the printer in the fifth modified embodiment is not provided with the configuration that helps the ink flowing from the through hole 67 into the holding space 65 reach the ink absorbing foam 62 with the printer having the reverse posture (the configuration in which the ribs 64b and 64d are arranged at the interval).

Figure 11A:
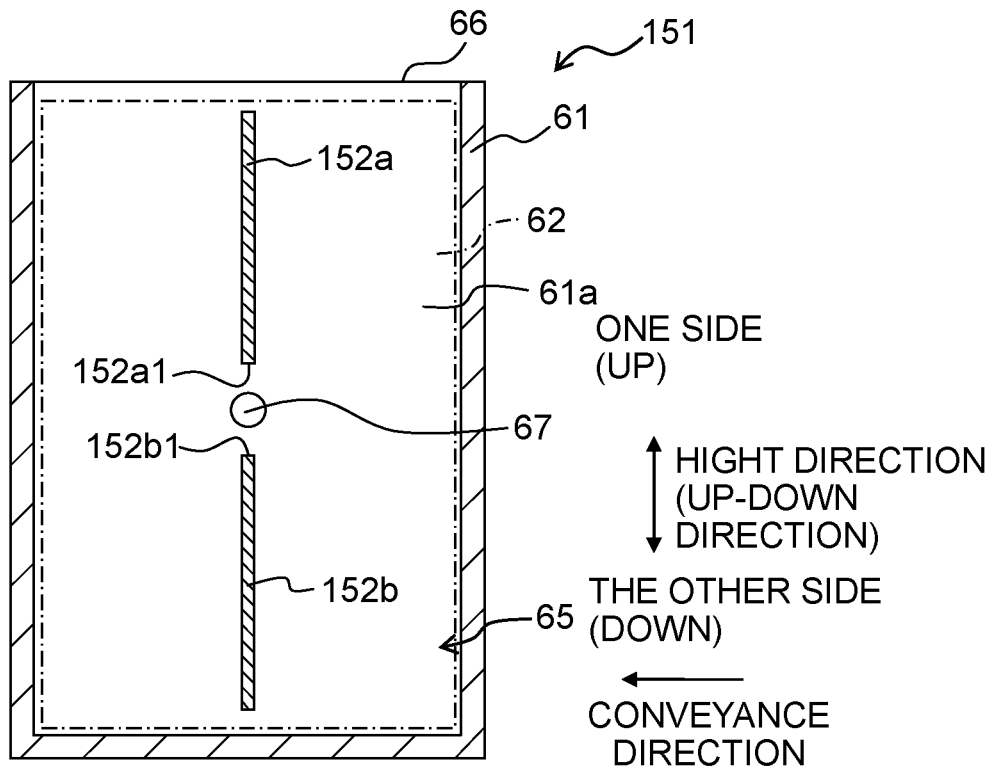
FIG. 11A is a diagram of a sixth modified embodiment corresponding to FIG. 3.
Figure 11B:
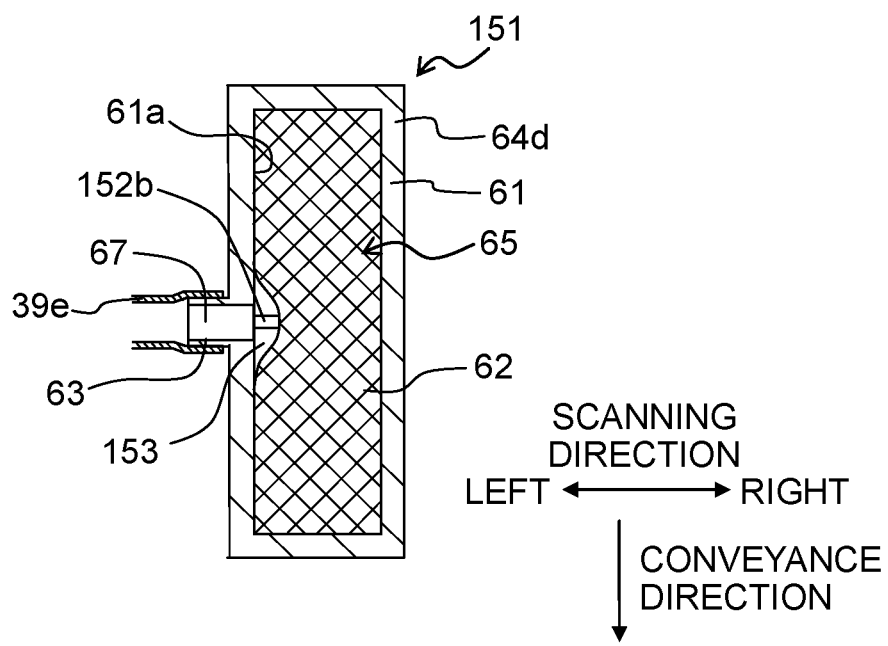
FIG. 11B is a diagram of the sixth modified embodiment corresponding to FIG. 4B.

In the above embodiment, the two ribs 64a and 64b extending along the inner wall surface 61a in the height direction are arranged in the conveyance direction with the interval, and the two ribs 64c and 64d extending along the inner wall surface 61a in the height direction are arranged in the conveyance direction with the interval. The present teaching, however, is not limited thereto. In a sixth modified embodiment, as depicted in FIGS. 11A and 11B, a waste liquid tank 151 is provided with a rib 152a (an exemplary rib or an exemplary first rib of the present teaching) that is disposed at the first side in the height direction relative to the through hole 67 and extends along the inner wall surface 61a in the height direction. Further, the waste liquid tank 151 is provided with a rib 152b (an exemplary second rib of the present teaching) that is disposed at the second side in the height direction relative to the through hole 67 and extends along the inner wall surface 61a in the height direction. In the sixth modified embodiment, an end 152a1 of the rib 152a is disposed at the first side in the height direction relative to the through hole 67 (the end 152a1 is positioned closer to the communication port 66 than the through hole 67). An end 152b1 of the rib 152b is disposed at the second side in the height direction relative to the through hole 67 (the end 152b1 is positioned farther from the communication port 66 than the thorough hole 67). The ribs 152a, 152b have the same position in the conveyance direction as the center of the through hole 67, and the rib 152a, the rib 152b, and the through hole 67 are aligned in the height direction.

Also in the sixth modified embodiment, the ink absorbing foam 62 is deformed by making contact with front ends of the ribs 152a and 152b to form, between the ink absorbing foam 62 and the inner wall surface 61a, a gap 153 that communicates with the communication port 66. This allows the caps 41a and 41b (see FIG. 2) to communicate with the atmosphere via the tubes 39a and 39b, the switching unit 42, the tube 39e, the through hole 67, the gap 153, and the communication port 66.

In that configuration, the through hole 67, the rib 152a, and the rib 152b are not arranged in the conveyance direction. Thus, the ribs 152a and 152b are not positioned immediately below the through hole 67 with the printer having the transport posture or the reverse posture. This allows the ink flowing from the through hole 67 into the holding space 65 to flow downward and be absorbed by the ink absorbing foam 62. Accordingly, the ink is prevented from flowing along the rib 152a and leaking from the communication port 66.

In the sixth modified embodiment, the through hole 67, the rib 152a, and the rib 152b are arranged in the height direction. The present teaching, however, is not limited thereto. The position of the ribs 152a, 152b in the conveyance direction may be different from the position of the through hole 67 in the conveyance direction.

Figure 12A:
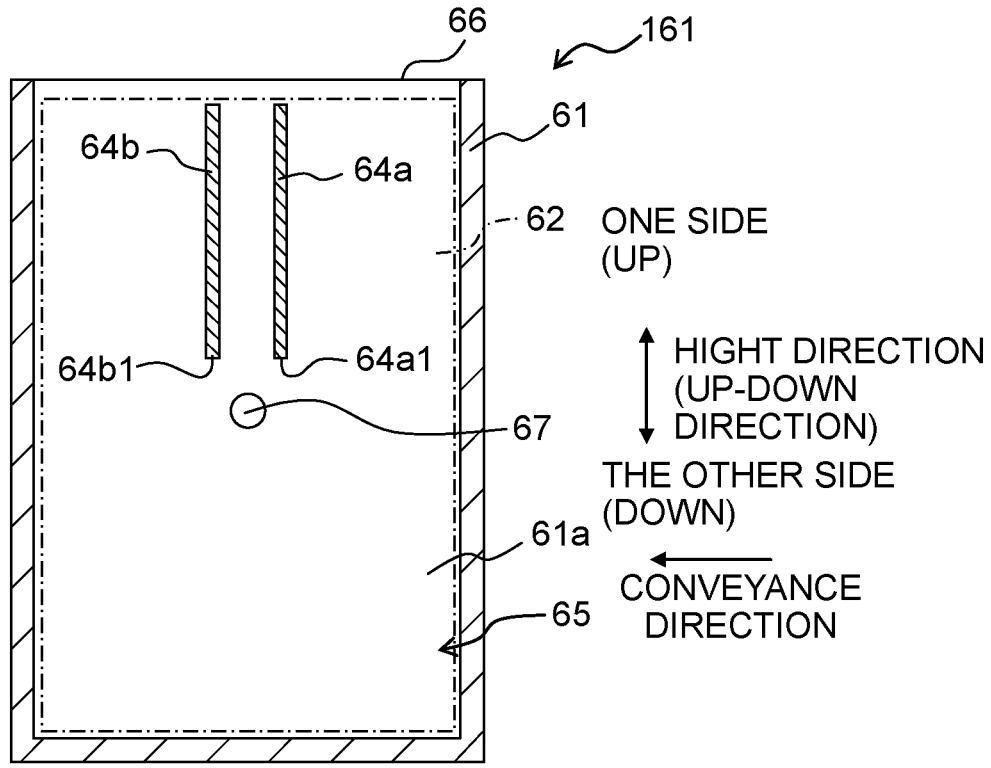
FIG. 12A is a diagram of a seventh modified embodiment corresponding to FIG. 3.
Figure 12B:
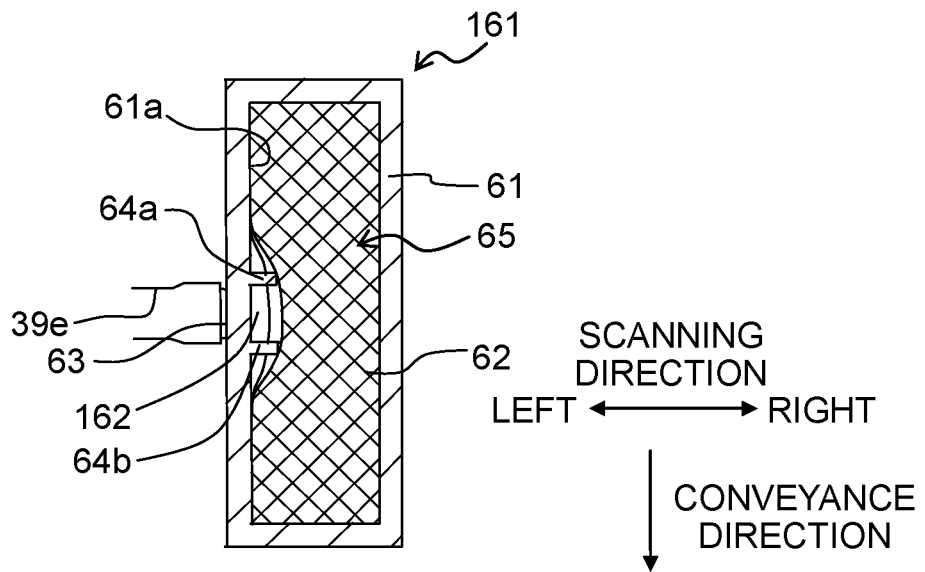
FIG. 12B is a diagram of the seventh modified embodiment corresponding to FIG. 4A.

In the above embodiments, the ribs are disposed at the first and second sides in the height direction relative to the through hole 67. The present teaching, however, is not limited thereto. For example, in a seventh modified embodiment, as depicted FIGS. 12A and 12B, a waste liquid tank 161 eliminates the ribs 64c and 64d provided in the waste liquid tank 121 of the third modified embodiment.

Also in the seventh modified embodiment, the ink absorbing foam 62 is deformed by making contact with front ends of the ribs 64a and 64b to form, between the ink absorbing foam 62 and the inner wall surface 61a, a gap 162 that communicates with the communication port 66. This allows the caps 41a and 41b (see FIG. 2) to communicate with the atmosphere via the tubes 39a and 39b, the switching unit 42, the tube 39e, the through hole 67, the gap 162, and the communication port 66.

In that configuration, the through hole 67, the rib 64a, and the rib 64b are not arranged in the conveyance direction. Thus, the ribs 64a, 64b are not positioned immediately below the through hole 67 with the printer having the transport posture or the reverse posture. This allows the ink flowing from the through hole 67 into the holding space 65 to flow downward and be absorbed by the ink absorbing foam 62. Accordingly, the ink is prevented from flowing along the ribs 64a and 64b and leaking from the communication port 66.

In the seventh modified embodiment, however, no rib is provided at the second side in the height direction relative to the through hole 67. Thus, the length of the gap 162 in the conveyance direction at the second side in the height direction relative to the ribs 64a and 64b is shorter toward the downstream side in the conveyance direction (as the distance to the ribs 64a and 64b is longer). Thus, when the through hole 67 is too far away from the ends 64a1, 64b1 of the ribs 64a, 64b in the height direction (i.e., the through hole 67 is disposed at a considerably lower position in the up-down direction), the through hole 67 may be closed with the ink absorbing foam 62.

In the seventh modified embodiment, the two ribs 64a and 64b are disposed at the first side in the height direction relative to the through hole 67. The present teaching, however, is not limited thereto. One of the ribs 64a and 64b may be disposed at the first side in the height direction relative to the through hole 67. Or, a rib similar to the rib 152a of the sixth modified embodiment may be disposed at the first side in the height direction relative to the through hole 67.

Figure 13:
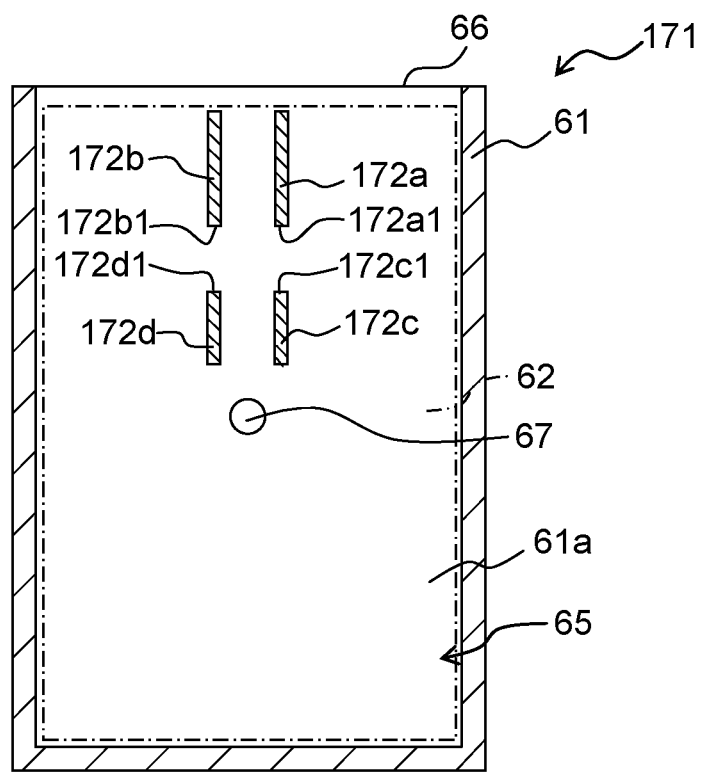
FIG. 13 is a diagram of an eighth modified embodiment corresponding to FIG. 3.

In an eighth modified embodiment, as depicted in FIG. 13, a waste liquid tank 171 is provided with ribs 172a to 172d extending along the inner wall surface 61a in the height direction, at the first side in the height direction relative to the through hole 67. No ribs are provided at the second side in the height direction relative to the through hole 67. The ribs 172a, 172c are arranged at the upstream side in the conveyance direction relative to the through hole 67 with an interval in the height direction. The ribs 172b, 172d are arranged at the downstream side in the conveyance direction relative to the through hole 67 with an interval in the height direction.

In the eighth modified embodiment, arranging the ribs 172a to 172d in the above positions allows ends 172a1, 172b1 of the ribs 172a, 172b and ends 172c1, 172d1 of the ribs 172c, 172d to be disposed at positions closer to the communication port 66 than the through hole 67. In the eighth modified embodiment, the rib 172a corresponds to an exemplary rib or an exemplary first rib of the present teaching, the rib 172b corresponds to an exemplary third rib of the present teaching, the rib 172c corresponds to an exemplary second rib of the present teaching, and the rib 172d corresponds to an exemplary fourth rib of the present teaching.

In the eighth modified embodiment, the through hole 67 and the ribs 172a to 172d are not arranged in the conveyance direction. Thus, the ribs 172a to 172d are not positioned immediately below the through hole 67 with the printer having the transport posture or the reverse posture. This allows the ink flowing from the through hole 67 into the holding space 65 to flow downward and be absorbed by the ink absorbing foam 62. Even when the ink reaches the ribs 172c and 172d, the ink easily reaches the ink absorbing foam 62 by flowing along the ribs 172c, 172d and flowing between the ribs 172a and 172c or flowing between the ribs 172b and 172d. Accordingly, the ink is prevented from flowing along the ribs 172a and 172b and leaking from the communication port 66.

In the eighth modified embodiment, the ribs 172a, 172c are arranged at the first side in the height direction relative to the through hole 67 with the interval in the conveyance direction and the ribs 172b, 172d are arranged at the first side in the height direction relative to the through hole 67 with the interval in the conveyance direction. The present teaching, however, is not limited thereto. Only one set of the ribs 172a, 172c and the ribs 172b, 172d may be disposed at the first side in the height direction relative to the through hole 67. Or, two ribs may be disposed at the first side in the height direction relative to the through hole 67 at an interval such that the two ribs and the through hole 67 are aligned in the height direction.

In the eighth modified embodiment, the ribs 172c and 172d may extend to the same position as the through hole 67 in the height direction. In that configuration, although the ink flowing from the through hole 67 into the holding space 65 with the printer having the transport posture or the reverse posture is likely to reach the ribs 172c and 172d, the ink reaching the ribs 172c and 172d easily reaches the ink absorbing foam 62 by flowing along the ribs 172c, 172d and flowing between the rib 172a and the rib 172c or flowing between the rib 172b and the rib 172d. Further, in that configuration, the rib 172c, the rib 172d, and be through hole 67 are arranged in the conveyance direction, so that the through hole 67 reliably faces a gap between the ink absorbing foam 62 and the inner wall surface 61a. This prevents the through hole 67 from being closed with the ink absorbing foam 62.

In the fourth, sixth, seventh, and eighth modified embodiments, the respective waste liquid tanks are provided with no guide rib extending along the inner wall surface 61a in the conveyance direction. In those modified embodiments, however, the respective waste liquid tanks may include the guide rib(s).

In each of the waste liquid tanks according to the above embodiment and the modified embodiments, the entire end, of the waste liquid tank, at the first end in the height direction is the communication port that connects the holding space and the outside to allow the holding space to communicate with the atmosphere. The present teaching, however, is not limited thereto. For example, a wall defining an end of the holding space at the first side in the height direction may be provided at an end of the casing at the first side in the height direction, and the communication port may be provided at a left end of the wall in the scanning direction to overlap, in the height direction, with the gap between the ink absorbing foam and the inner wall surface of the casing.

In the above embodiment, the waste liquid tank 44 is configured to hold the ink discharged through the suction purge. The present teaching, however, is not limited thereto. For example, the printer 1 may perform flushing by which ink is discharged from each nozzle 10 to the cap 41 (caps 41*a*, 41*b*), and the ink discharged through the flushing may be held in the waste liquid tank 44. In that case, the suction pump 43 is driven after the flushing in a state where the caps 41*a*, 41*b* are connected to the suction pump 43 by use of the switching unit 42. This moves the ink held in the caps 41*a*, 41*b* to the waste liquid tank 44. Here, in the printer 1, a combination of the ink-jet head 13; the ink cartridges 26; the cap 41; the switching unit 42; the suction pump 43; the tube 23; and tubes 39*a* to 39*e* corresponds to an exemplary liquid discharging unit of the present teaching.

In the above embodiment and modified embodiments, the suction pump 43 may not be provided, and a port (hereinafter referred to as a waste liquid port) corresponding to the suction port 53 of the switching unit 42 may be directly connected with the waste liquid tank 44 via a tube. During or after the flushing, the cap ports 51, 52 may be connected to the waste liquid port by use of the switching unit 42, thus allowing the ink discharged into the caps 41*a*, 41*b* to flow to the waste liquid tank due to gravity etc. Here, in the printer 1, a combination of the ink-jet head 13; the ink cartridges 26; the cap 41; the switching unit 42; the tube 23: the tubes 39*a*, 39*b*, and 39*e*; and the tube connecting the waste liquid port and the waste liquid tank 44 corresponds to an exemplary liquid discharging unit of the present teaching.

In the above embodiment and the modified embodiments, the ink is supplied from each ink cartridge 26 installed to the cartridge installation part 25 to the ink-jet head 13 via the sub tank 12. The present teaching, however, is not limited thereto. For example, ink tanks (each of which is an exemplary supply tank of the present teaching) holding the respective inks to be supplied to the ink-jet head 13 may be provided in place of the cartridge installation parts 25, and the ink tanks may be replenished with the respective inks.

In the above embodiment and the modified embodiments, the explanation is made about an example in which the present teaching is applied to the printer provided with the waste liquid tank that holds the waste ink discharged from the ink-jet head. The present teaching, however, is not limited thereto. For example, the present teaching may be applied to a liquid jetting apparatus that jets any other liquid than ink, such as a material of a wiring pattern of a wiring substrate or applied to a waste liquid tank provided in any liquid jetting apparatus. Further, the waste liquid tank may hold a waste liquid discharged from a liquid discharging unit provided in any other apparatus than the liquid jetting apparatus. For example, the liquid discharging unit may be a unit provided in a metal processing apparatus that automatically processes metal into a predefined shape, wherein a cutting oil is jetted or discharged to ease friction between a processed object and a processing tool and a waste liquid tank in which the cutting oil jetted is collected and held is provided.

What is claimed is:

1. A tank configured to hold a waste liquid discharged from a liquid discharging unit, the tank comprising:
    a casing including:
        an inner wall surface defining a space in which the waste liquid is held; and
        a communication port connecting the space and an outside;
    an absorber placed in the space;
    a rib protruding from the inner wall surface, the rib extending along the inner wall surface in an extending direction from a position distant from the communication port toward a position close to the communication port, the rib being in contact with the absorber with a gap between the absorber and a part of the inner wall surface; and
    an atmosphere communication hole provided in the part of the inner wall surface, the atmosphere communication hole being connected to the liquid discharging unit,
    wherein the gap between the absorber and the part of the inner wall surface is connected to the communication port and to the atmosphere communication hole such that the gap allows atmosphere to communicate with the liquid discharging unit and the outside via the gap and the communication port,
    wherein an end of the rib on a side opposite to the communication port in the extending direction is positioned closer to the communication port than the atmosphere communication hole.

2. The tank according to claim 1, wherein the rib includes a first rib, and
    wherein the tank further comprises a second rib protruding from the inner wall surface, the second rib being placed to be separated from the first rib at a position more distant from the communication hole than the first rib, the second rib extending along the inner wall surface in the extending direction.

3. The tank according to claim 2, wherein the second rib offsets the atmosphere communication hole in an orthogonal direction.

4. The tank according to claim 2, wherein at least a part of the second rib is located at a position more distant in the extending direction from the communication port than the atmosphere communication hole.

5. The tank according to claim 2, wherein an end of the second rib on a side close to the communication port in the extending direction is more distant from the communication port than the atmosphere communication hole.

6. A tank configured to hold a waste liquid discharged from a liquid discharging unit, the tank comprising:
    a casing including:
        an inner wall surface defining a space in which the waste liquid is held; and
        a communication port connecting the space and an outside;
    an absorber placed in the space;
    a rib protruding from the inner wall surface, the rib extending along the inner wall surface in an extending direction from a position distant from the communication port toward a position close to the communication port, the rib being in contact with the absorber with a gap between the absorber and a part of the inner wall surface; and
    an atmosphere communication hole provided in the part of the inner wall surface, the atmosphere communication hole being connected to the liquid discharging unit to allow atmosphere to communicate with the liquid discharging unit and the outside via the gap and the communication port, wherein an end of the rib on a side opposite to the communication port in the extending direction is positioned closer to the communication port than the atmosphere communication hole, wherein the rib includes a first rib, wherein the tank further comprises a second rib protruding from the inner wall surface, the second rib being placed to be separated from the first rib at a position more distant from the communication hole than the first rib, the second rib extending along the inner wall surface in the extending direction, wherein positions of the first rib and the second rib in an orthogonal direction which is parallel to the inner wall surface and orthogonal to the extending direction are different from a position of the atmosphere communication hole in the orthogonal direction, and wherein the tank further comprises a third rib protruding from the inner wall surface and extending along the inner wall surface in the extending direction, the atmosphere communication hole being located between the third rib and the first and second ribs in the orthogonal direction.

7. A tank configured to hold a waste liquid discharged from a liquid discharging unit, the tank comprising:

a casing including:
an inner wall surface defining a space in which the waste liquid is held; and
a communication port connecting the space and an outside;

an absorber placed in the space;

a rib protruding from the inner wall surface, the rib extending along the inner wall surface in an extending direction from a position distant from the communication port toward a position close to the communication port, the rib being in contact with the absorber with a gap between the absorber and a part of the inner wall surface; and an atmosphere communication hole provided in the part of the inner wall surface, the atmosphere communication hole being connected to the liquid discharging unit to allow atmosphere to communicate with the liquid discharging unit and the outside via the gap and the communication port, wherein an end of the rib on a side opposite to the communication port in the extending direction is positioned closer to the communication port than the atmosphere communication hole, wherein the rib includes a first rib, wherein the tank further comprises a second rib protruding from the inner wall surface, the second rib being placed to be separated from the first rib at a position more distant from the communication hole than the first rib, the second rib extending along the inner wall surface in the extending direction, wherein positions of the first rib and the second rib in an orthogonal direction which is parallel to the inner wall surface and orthogonal to the extending direction are different from a position of the atmosphere communication hole in the orthogonal direction, and wherein the tank further includes a third rib and a fourth rib protruding from the inner wall surface and extending along the inner wall surface in the extending direction, the third rib offset the fourth rib in the extending direction with an interval, positions of the third rib and the fourth rib in the orthogonal direction are different from the position of the atmosphere communication hole in the orthogonal direction, the third rib and the fourth rib offset the first rib and the second rib in the orthogonal direction, the third rib and the fourth rib are located at one side of the atmosphere communication hole in the orthogonal direction and the first rib and the second rib are located at the other side of the atmosphere hole in the orthogonal direction.

8. A tank configured to hold a waste liquid discharged from a liquid discharging unit, the tank comprising:

a casing including:
an inner wall surface defining a space in which the waste liquid is held; and
a communication port connecting the space and an outside;

an absorber placed in the space;

a rib protruding from the inner wall surface, the rib extending along the inner wall surface in an extending direction from a position distant from the communication port toward a position close to the communication port, the rib being in contact with the absorber with a gap between the absorber and a part of the inner wall surface; and an atmosphere communication hole provided in the part of the inner wall surface, the atmosphere communication hole being connected to the liquid discharging unit to allow atmosphere to communicate with the liquid discharging unit and the outside via the gap and the communication port, wherein an end of the rib on a side opposite to the communication port in the extending direction is positioned closer to the communication port than the atmosphere communication hole, wherein the rib includes a first rib, wherein the tank further comprises a second rib protruding from the inner wall surface, the second rib being placed to be separated from the first rib at a position more distant from the communication hole than the first rib, the second rib extending along the inner wall surface in the extending direction, wherein positions of the first rib and the second rib in an orthogonal direction which is parallel to the inner wall surface and orthogonal to the extending direction are different from a position of the atmosphere communication hole in the orthogonal direction, and wherein the tank further includes a guide rib protruding from the inner wall surface, the guide rib being positioned between the first rib and the second rib in the extending direction, the guide rib extending along the inner wall surface in a direction intersecting with the extending direction at a position more distant in the orthogonal direction from the atmosphere communication hole than the first rib and the second rib.

9. The tank according to claim 8, wherein the shortest distance between the atmosphere communication hole and the guide rib is shorter than the shortest distance between the atmosphere communication hole and the first rib.

10. The tank according to claim 8, wherein the guide rib includes two ribs offset each other in the extending direction with an interval between the two ribs of the guide rib, and wherein the atmosphere communication hole is positioned between the two ribs of the guide rib in the extending direction.

11. The tank according to claim 8, further comprising a third rib protruding from the inner wall surface and extending along the inner wall surface in the extending direction, the first rib and the second rib are located at an opposite side of the atmosphere communication hole to the first rib and the second rib in the orthogonal direction, wherein the guide rib includes two ribs offset each other in the extending direction with an interval,
wherein the interval between the two ribs in the extending direction is longer than an interval between the third rib and the first rib in the orthogonal direction, and
wherein the interval between the two ribs in the extending direction is longer than an interval between the third rib and the second rib in the orthogonal direction.

12. A tank configured to hold a waste liquid discharged from a liquid discharging unit, the tank comprising:
a casing including:
an inner wall surface defining a space in which the waste liquid is held; and
a communication port connecting the space and an outside;
an absorber placed in the space;
a rib protruding from the inner wall surface, the rib extending along the inner wall surface in an extending direction from a position distant from the communication port toward a position close to the communication port, the rib being in contact with the absorber with a gap between the absorber and a part of the inner wall surface; and
an atmosphere communication hole provided in the part of the inner wall surface, the atmosphere communication hole being connected to the liquid discharging unit to allow atmosphere to communicate with the liquid discharging unit and the outside via the gap and the communication port,
wherein an end of the rib on a side opposite to the communication port in the extending direction is positioned closer to the communication port than the atmosphere communication hole,
wherein the liquid discharging unit includes:
a liquid discharging head including nozzles located on a nozzle surface;
a supply tank connected to the liquid discharging head, the supply tank configured to hold a liquid to be supplied to the liquid discharging head; and
a cap configured to cover the nozzles,
wherein the extending direction intersects with the nozzle surface, and
wherein the atmosphere communication hole is connected to the cap.

13. A liquid discharging apparatus, comprising:
a liquid discharging head including nozzles located on a nozzle surface;
a supply tank connected to the liquid discharging head and configured to hold a liquid to be supplied to the liquid discharging head;
a cap configured to cover the nozzles; and
a waste liquid tank configured to hold a waste liquid discharged from the liquid discharging head,
wherein the waste liquid tank includes:
a casing including:
an inner wall surface defining a space in which the waste liquid is held; and
a communication port provided at one end in an extending direction intersecting with the nozzle surface, and connecting the space and an outside;
an absorber placed in the space;
a rib protruding from the inner wall surface, the rib extending along the inner wall surface in the extending direction from a position distant from the communication port toward a position close to the communication port, the rib being in contact with the absorber with a gap between the absorber and a part of the inner wall surface; and
an atmosphere communication hole provided in the part of the inner wall surface, the atmosphere communication hole being connected to the cap, the gap between the absorber and the part of the inner wall surface being connected to the communication port and to the atmosphere communication hole such that the gap allows atmosphere to communicate with the cap and the outside via the gap and the communication port,
wherein an end of the rib on a side opposite to the communication port in the extending direction is positioned closer to the communication port than the atmosphere communication hole.

14. The liquid discharging apparatus according to claim 13, wherein a position of the liquid discharging head in an orthogonal direction parallel to the inner wall surface and orthogonal to the extending direction is different from a position of the supply tank in the orthogonal direction.

15. The liquid discharging apparatus according to claim 14, further comprising:
an apparatus body installing the liquid discharging head, the supply tank, the cap, and the waste liquid tank; and
a medium cassette being removably received to the apparatus body from one side in the orthogonal direction, the medium cassette configured to load mediums,
wherein the supply tank is positioned on the one side in the orthogonal direction relative to the liquid discharging head.

16. The liquid discharging apparatus according to claim 15, wherein the atmosphere communication hole is positioned on the other side in the orthogonal direction relative to the cap.

* * * * *